(12) United States Patent  (10) Patent No.: US 7,825,331 B2
Allais et al.  (45) Date of Patent: Nov. 2, 2010

(54) ELECTRICAL BUSHING

(76) Inventors: Arnaud Allais, Impasse de la coterette, F-22940 Saint Julien (FR); Pierre Mirebeau, 21, rue Jean-Baptisete Coret, F-91140 Villebon sur Yvette (FR)

( * ) Notice: Subject to any disclaimer, the term of this patent is extended or adjusted under 35 U.S.C. 154(b) by 994 days.

(21) Appl. No.: 11/599,168

(22) Filed: Nov. 13, 2006

(65) Prior Publication Data

US 2007/0181324 A1  Aug. 9, 2007

(30) Foreign Application Priority Data

Jan. 24, 2006  (EP)  .................................. 06290159

(51) Int. Cl.
 *H01B 12/00* (2006.01)
(52) U.S. Cl. .................... 174/15.4; 174/15.5; 174/73.1; 174/152 R; 16/2.1; 16/2.2
(58) Field of Classification Search .................. 174/142, 174/137 R, 140 C, 143, 178, 179, 137 A, 174/181, 189, 195, 196, 209, 135, 152 G, 174/152 R, 31 R, 650, 19, 73.1, 14 BH, 15.3, 174/15.4, 15.6, 15.5, 88 R; 248/56; 16/2.1, 16/2.2
See application file for complete search history.

(56) References Cited

U.S. PATENT DOCUMENTS

| 3,775,547 | A | * | 11/1973 | Woods ................... 174/152 R |
|---|---|---|---|---|
| 3,783,181 | A | * | 1/1974 | Martincic et al. ........... 174/142 |
| 4,060,583 | A | * | 11/1977 | Groves et al. ................. 174/19 |
| 4,294,504 | A |  | 10/1981 | Siewerdt ..................... 339/132 |
| 4,401,841 | A | * | 8/1983 | Meyer et al. .............. 174/31 R |
| 4,500,745 | A | * | 2/1985 | Miggins ................... 174/31 R |
| 7,262,367 | B2 | * | 8/2007 | Donzel et al. ............... 174/142 |
| 7,388,148 | B2 | * | 6/2008 | Lallouet et al. ............ 174/15.5 |
| 7,709,738 | B2 | * | 5/2010 | Mirebeau et al. .......... 174/73.1 |
| 2003/0154727 | A1 |  | 8/2003 | Ashibe ....................... 62/45.1 |

FOREIGN PATENT DOCUMENTS

| GB | 1530687 | 11/1978 |
| JP | 59029479 | 2/1994 |
| WO | 9528750 | 10/1995 |

OTHER PUBLICATIONS

European Search Report- Jun. 1, 2006.

* cited by examiner

*Primary Examiner*—Angel R Estrada
(74) *Attorney, Agent, or Firm*—Sofer & Horoun, LLP

(57) ABSTRACT

An electrical bushing (1) for connecting a superconducting device to a device located at ambient temperature, the bushing (1) having an electrical conductor (9) and an insulating layer (10) surrounding the electrical conductor (9). An interlayer (15) is provided between the electrical conductor (9) and the insulating layer (10) and makes it possible for the electrical conductor (9) to slide in the insulating layer (10) within a temperature range of from 70 kelvin to the ambient temperature. A field control layer (11) is also applied to the insulating layer (10).

7 Claims, 2 Drawing Sheets

ELECTRICAL BUSHING

RELATED APPLICATION

This application is related to and claims the benefit of priority from European Patent Application No. 06290159.0, filed on Jun. 9, 2006, the entirety of which is incorporated herein by reference.

DESCRIPTION

Field of the Invention

The invention relates to an electrical bushing.

BACKGROUND

EP 1 283 576 A has disclosed an electrical bushing which connects the conductor of a superconductor cable to an electrical supply system. The conductor of the bushing comprises a copper conductor, which is surrounded by a solid electrically insulating layer, for example ethylene-propylene rubber or similar materials.

The known bushing connects the conductor of a superconductor cable to an electrical supply system, the bushing passing through a region having a low temperature, for example liquid nitrogen, a region having a slightly higher temperature (gaseous nitrogen) up to a region at ambient temperature in order to increase the distance between the point at which the conductor of the superconductor cable is connected to the conductor of the bushing and the region at ambient temperature.

With this bushing, problems may result in the event of changes in temperature if, for example, the superconductor cable is brought into or taken out of operation. Owing to the different coefficients of thermal expansion of the conductor material of the bushing (copper, aluminium etc.) and of the insulating material, thermomechanical stresses result which destroy the bushing in the region of the conductor/insulating layer.

DE 26 07 516 A1 has disclosed an electrical cable having a conductor and an insulating layer surrounding the conductor. An interlayer is provided between the conductor and the insulating layer and consists of a material which prevents adhesion of the insulating layer on the conductor and, as a result, makes it easier for the insulating layer to be removed from the conductor.

OBJECTS AND SUMMARY

The present invention is based on the object of providing an electrical bushing, in the case of which destruction of the insulating layer owing to thermomechanical stresses is avoided.

Advantageous refinements of the invention are described in the description of an exemplary embodiment of the invention.

DETAILED DESCRIPTION

The substantial advantage of the invention consists in the fact that the force-fitting connection between the conductor and the insulating layer is dispensed with owing to the interlayer, and an unimpeded relative movement between the conductor and the insulating layer is made possible. The interlayer can comprise a solid material or a liquid or viscous material; it is only important that the interlayer ensures isolation between the conductor and the insulating layer of the bushing, at least within a temperature range of from approximately 70 K. to the ambient temperature.

The invention is explained in more detail with reference to the exemplary embodiment illustrated schematically in FIGS. 1 and 2.

Figure 1:
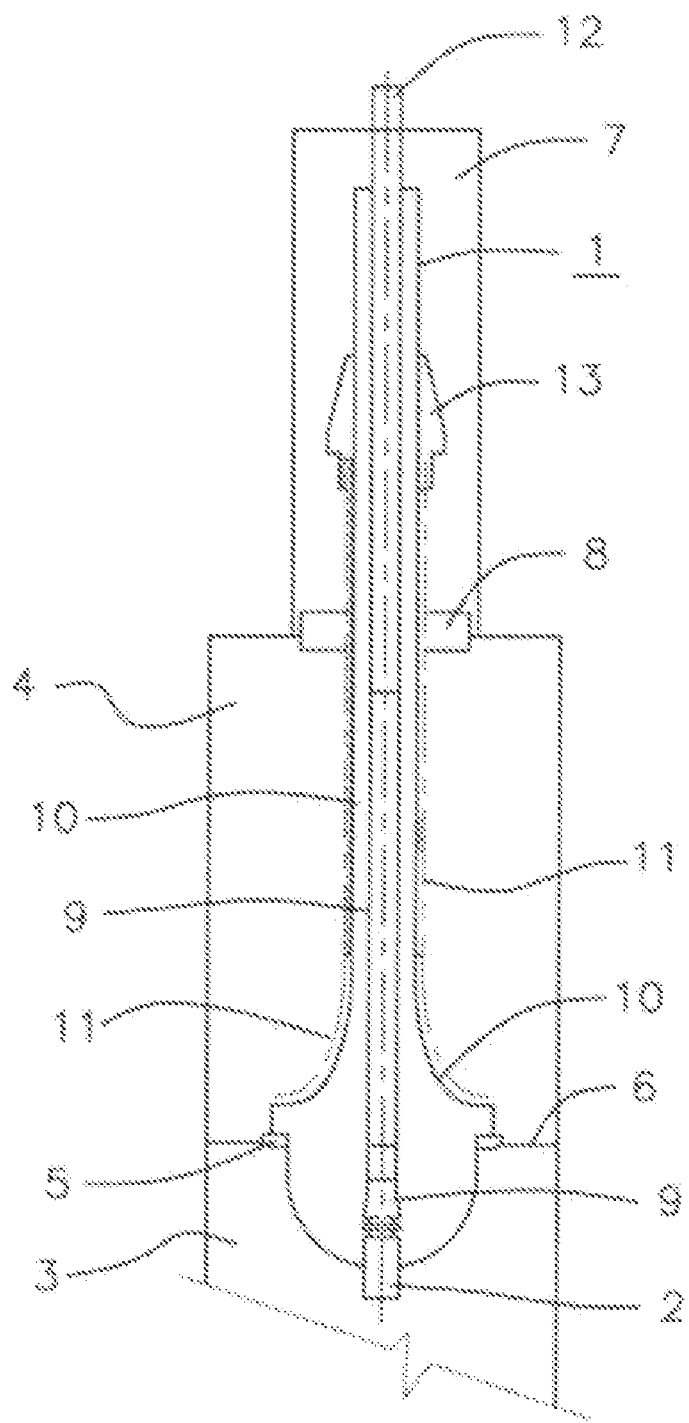
FIG. 1 shows an exemplary embodiment of an electrical bushing, in accordance with one embodiment of the present invention.

FIG. 1 shows an exemplary embodiment of an electrical bushing 1 for connecting a superconducting cable 2 to an electrical conductor (not illustrated). The connection to the superconducting cable 2 is located in a housing 3, in which a temperature in the region of 70 kelvin prevails. Adjacent to the housing 3 there is a further housing 4, which is connected to the housing 3 via a flange connection 5. A partition wall 6 separates the interiors of the housings 3 and 4 from one another. The interior of the housing 4 is preferably filled with a solid thermal insulating material, for example polyurethane foam or a foamed glass material.

Above the housing 4 there is also a further housing 7, in which the ambient temperature prevails. The housing 4 is partitioned off from the housing 7 by a tight partition wall 8.

The temperature prevailing in the housing 4 is between the cryogenic temperature in the housing 3 and the ambient temperature in the housing 7. The outer walls of the housings 3 and 4 form a cryostat for good thermal insulation.

The bushing 1 has a central conductor 9, which is provided with an insulating layer 10. Furthermore, a field control layer 11 is also provided on the insulating layer 10 and extends at least over part of the insulating layer 10. At the upper end of the bushing 1, a connection 12 for connection to an electrical supply system is provided.

The field control layer 11 comprises a layer of zinc or another conductive material which adheres to the outer surface of the insulating layer 10. The field control layer 11 is preferably applied in the form of a coating layer. The insulating layer 10 consists of a thermoplastic or crosslinked material based on polyethylene or polypropylene. However, the insulating layer 10 can also consist of epoxy resin. The field control layer 11 is connected to a field control cone 13, which is known in high-voltage engineering.

Figure 2:
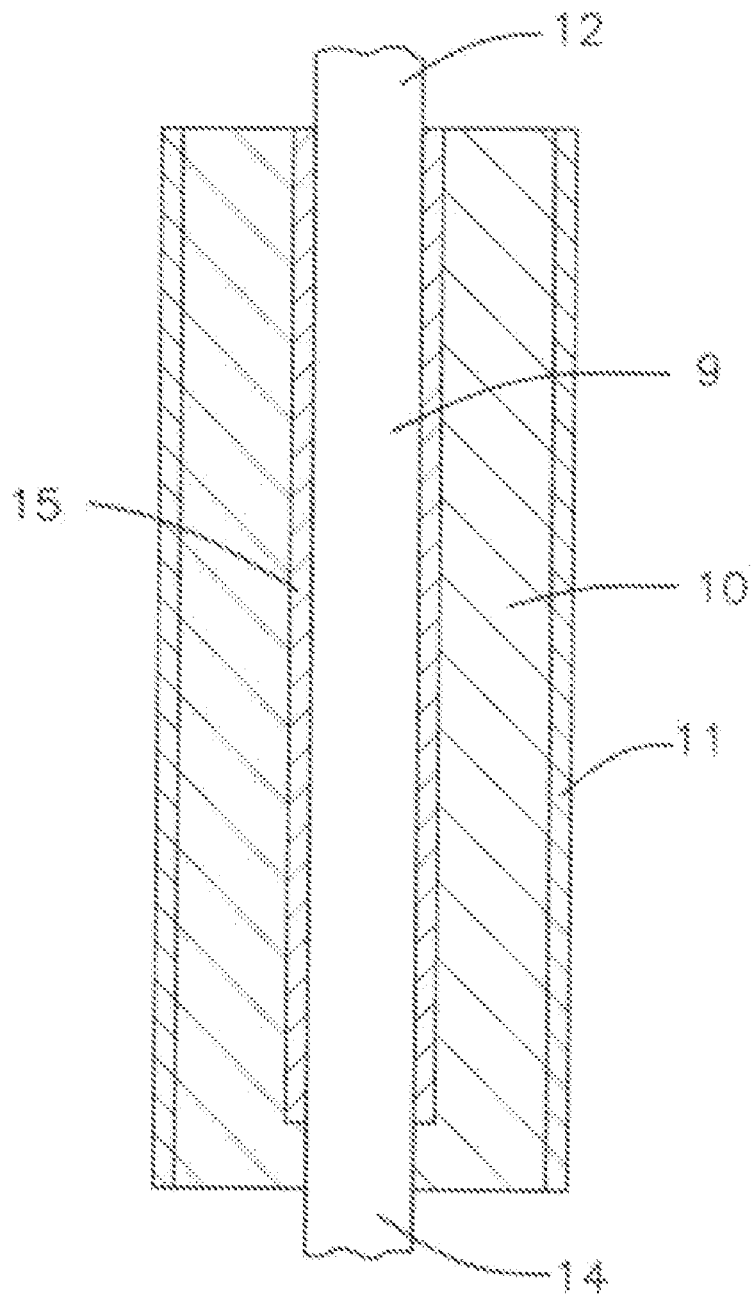
FIG. 2 shows an enlarged illustration of the conductor, in accordance with one embodiment of the present invention.

FIG. 2 shows an enlarged illustration of the conductor 9. The ends 12 and 14 protrude out of the insulating layer 10. The end 12 is connected to the supply system via a cable (not illustrated), and the end 14 is connected to the conductor of the superconductor cable.

In accordance with the teaching of the invention, an interlayer 15 is provided between the conductor 9 and the insulating layer 10 and is intended to make it possible for the conductor 9 to slide unimpeded in the insulating layer 10. It has been shown that, when the insulating layer 10 is applied to the conductor 9, said insulating layer adheres to the conductor. Owing to the different coefficients of expansion of the metal for the conductor 9, for example copper, and the material for the insulation, during cooling in the operating state of the superconductor cable or during heating in the event of the superconductor cable being switched off, thermomechanical stresses result in the insulating layer 10, as a result of which the insulating layer 10 is destroyed. Owing to the interlayer 15, which prevents an adhering connection between the surface of the conductor 9 and the insulating layer 10, the bushing is fully functional even after several temperature cycles.

Suitable materials for the interlayer are solid substances or liquids, in which case the liquids should not become solid in a temperature range of from approximately 70 K. to the ambient temperature. Preferred examples of liquids are mineral oils or else polyisobutylene. Solid substances may be taping or coatings applied to the conductor 9. Examples of taping are paper tape, which can also be impregnated or coated with mineral oil, PTFE tape, fibreglass tape, mica tape or similar materials. Preferred solid coating materials for the conductor 9 are graphite or polytetrafluoropolyethylene (PTFE). In addition, materials can be used which contain graphite or PTFE powder as solid particles. Furthermore, combinations of taping, a liquid and solid materials having sliding properties are also possible.

The invention claimed is:

1. Electrical bushing for connecting a superconducting device to a device located at ambient temperature, the bushing comprising:
    an electrical conductor; and
    an insulating layer surrounding the electrical conductor, wherein an interlayer is provided between the electrical conductor and the insulating layer and makes it possible for the electrical conductor to slide in the insulating layer within a temperature range of from 70 kelvin to the ambient temperature, and in that a field control layer is provided on the insulating layer.

2. Electrical bushing according to claim 1, wherein the material of the interlayer is liquid or viscous in the mentioned temperature range.

3. Electrical bushing according to claim 2, wherein the interlayer is made from polytetrafluoroethylene.

4. Electrical bushing according to claim 1, wherein the interlayer is taping made from a material which is resistant to high voltages.

5. Electrical bushing according to claim 1, wherein the interlayer is made from graphite.

6. Electrical bushing according to claim 1, wherein the interlayer further comprises a tape coated with graphite.

7. Electrical bushing according to claim 1, wherein the interlayer further comprises a mica or fibreglass tape.

* * * * *